(12) United States Patent
Moon et al.

(10) Patent No.: US 6,714,528 B1
(45) Date of Patent: Mar. 30, 2004

(54) DEVICE AND METHOD FOR DIVERSITY COMBINING SIGNALS ON COMMON CHANNEL IN CDMA COMMUNICATION SYSTEM

(75) Inventors: Hi-Chan Moon, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/368,836

(22) Filed: Aug. 5, 1999

(30) Foreign Application Priority Data

Aug. 5, 1998 (KR) .......................... 1998-32353

(51) Int. Cl.[7] .............................................. H04B 7/216
(52) U.S. Cl. ...................... 370/342; 370/335; 370/441; 455/562; 455/560
(58) Field of Search ................................. 370/342, 341, 370/320, 331, 335, 329, 337, 328, 332, 349, 431–441, 469, 479, 470, 471–473, 350; 455/450, 464, 562, 442, 436, 437, 439, 444, 65, 273, 277.1, 277.2, 504, 506, 560; 375/200, 347, 349, 148; 340/826.01

(56) References Cited

U.S. PATENT DOCUMENTS

| | | | | |
|---|---|---|---|---|
| 5,493,695 A | * | 2/1996 | Aitkenhead et al. | 455/54.1 |
| 5,640,414 A | * | 6/1997 | Blakeney, II et al. | 375/200 |
| 5,652,748 A | * | 7/1997 | Johma et al. | 370/320 |
| 5,673,259 A | * | 9/1997 | Quick, Jr. | 370/342 |
| 5,742,911 A | * | 4/1998 | Dumbrill et al. | 455/562 |
| 5,832,389 A | * | 11/1998 | Dent | 455/562 |
| 5,920,553 A | * | 7/1999 | Keskitalo et al. | 370/335 |
| 5,940,774 A | * | 8/1999 | Schmidt et al. | 455/561 |
| 6,094,575 A | * | 7/2000 | Anderson et al. | 455/422 |
| 6,246,878 B1 | * | 6/2001 | Wallentin | 455/442 |
| 6,335,922 B1 | * | 1/2002 | Tiedemann, Jr. et al. | 370/335 |

FOREIGN PATENT DOCUMENTS

| | | |
|---|---|---|
| JP | 10-190616 | 7/1998 |
| WO | WO 98/30052 | 7/1998 |

OTHER PUBLICATIONS

Japanese Office Action dated Feb. 4, 2003, issued in a counterpart application, namely, Appln. No. 2000–564395.

* cited by examiner

Primary Examiner—Edward F. Urban
Assistant Examiner—C. Chow
(74) Attorney, Agent, or Firm—Dilworth & Barrese LLP

(57) ABSTRACT

A device and method for combining by a diversity technique signals on a common channel in a CDMA communication system. A first base station assigns a dedicated common channel to a mobile station within its coverage area. The first base station provides information about the assigned dedicated common channel to a base station controller to which the first base station is coupled. The base station controller provides the information to at least one second base station which is connected to the base station controller and adjacent to the first base station.

18 Claims, 7 Drawing Sheets

ACCESS CHANNEL LONG CODE MASK

| 41 | 33 | 32 | 28 | 27 | 25 | 24 | 9 | 8 | 0 |
|---|---|---|---|---|---|---|---|---|---|
| 110001111 | | ACN | | PCN | | BASE_ID | | PILOT_PN | |

ACN-ACCESS CHANNEL NUMBER
PCN-PAGING CHANNEL NUMBER
BASE_ID-BASE STATION IDENTIFICATION
PILOT_PN-PN OFFSET FOR FORWARD CDMA CHANNEL

PUBLIC LONG CODE MASK

| 41 | 32 | 31 | 0 |
|---|---|---|---|
| 1100011000 | | PERMUTED ESN | |

FIG.1B

DEVICE AND METHOD FOR DIVERSITY COMBINING SIGNALS ON COMMON CHANNEL IN CDMA COMMUNICATION SYSTEM

PRIORITY

This application makes reference to, incorporates the same herein, and claims all benefits accruing under 35 U.S.C. §119 from an application entitled DEVICE AND METHOD FOR DIVERSITY COMBINING SIGNALS ON COMMON CHANNEL IN CDMA COMMUNICATION SYSTEM earlier filed in the Korean Industrial Property Office on Aug. 5, 1998, and there duly assigned Serial No. 98-32353.

BACKGROUND OF THE INVENTION

1. Field of the Invention

The present invention relates to a message communication device and method for a mobile communication system, and, more particularly, to a device and method for transmitting and receiving messages on a common channel in a Code Division Multiple Access (CDMA) communication system.

2. Description of the Related Art

To transmit and receive data between a base station and a mobile station before a voice call is set up, TIA/EIA/IS-95 communication systems typically use common channels. For instance, the base station may use a paging channel to transmit messages to a mobile station, and a mobile station may use an access channel to transmit to the base station. After transmitting a message on the paging channel to the mobile station, the base station would receive the mobile station's response on the access channel. After transmitting a message on the access channel to the base station, the mobile station would receive the base station's response on the paging channel. There may be many paging and access channels. The paging channels are distinguished from each other by Walsh codes, and the access channels by long PN (Pseudo-Noise) codes. Different long code masks are used to assign the different long PN codes to the respective access channels.

FIG. 1A illustrates a long code generator in the IS-95 communication system and FIG. 1B shows the long code masks that are assigned to the access channels.

To transmit a message to the base station, the mobile station selects any channel, sets the appropriate transmission power, transmits the message, and waits for a response from the base station. If another mobile station selects the same channel at the same time, the two messages will contend for the same channel and the base station may not receive the message. After no response message is received for a predetermined time period, the mobile station retransmits the message with a higher transmission power than before and waits again for a response message transmitted from the base station.

On a traffic channel, if at least two base stations pick up a signal transmitted by a mobile station, that signal can be effectively received using the diversity effect. On the access channel, even if at least two base stations pick up the same signal, it is difficult for the base stations to know whether the signal is transmitted from the same user or from different users.

In the IS-95 communication system, if one cell is divided into a plurality of sectors, the respective sectors use different spread sequences, each with its own PN offset. However, it is still difficult to know whether the same signal picked up on one access channel by antennas in different sectors is transmitted from the same user or from different users.

FIG. 2 illustrates this problem. One base station is divided into three sectors α, β and γ. If 1ST USER and 2ND USER simultaneously transmit signals on the same access channel R_ACH1, the α sector antenna can pick up the access channel signal transmitted from the first user and a β sector antenna can pick up the access channel signal transmitted from the second user. If the base station receiver combines the signals received through the two antennas, it is impossible to receive these signals because of the interference between them. Thus, this contention phenomenon causes difficulty when applying a diversity technique to the access channel at the base station.

SUMMARY OF THE INVENTION

It is, therefore, an object of the present invention to provide a device and method by which a base station can combine common channel signals transmitted from a mobile station by a diversity technique in a CDMA communication system.

It is another object of the present invention to provide a device and method by which a base station designates an access channel for a mobile station, and a plurality of base stations receive signals on that access channel to raise the probability of successfully receiving the signals on the access channel in a CDMA communication system.

To achieve these and other objects of the present invention, there is provided a method for diversity combining signals on a common channel in a CDMA communication system, including the steps of:

1) assigning, at a first base station, a dedicated common channel to a mobile station;
2) transmitting, at said first base station, information about the assigned dedicated common channel to a base station controller coupled to said first base station; and
3) transmitting, at said base station controller, said information to at least one second base station which is connected to said base station controller and adjacent to said first base station.

BRIEF DESCRIPTION OF THE DRAWINGS

The above and other objects, features and advantages of the present invention will become more apparent from the following detailed description when taken in conjunction with the accompanying drawings in which:

FIG. 1B illustrates examples of long code masks;

DETAILED DESCRIPTION OF THE PREFERRED EMBODIMENT

Preferred embodiments of the present invention will be described hereinbelow with reference to the accompanying drawings.

The present invention is directed to diversity combination of an access channel between sector antennas in a base station or between different base stations by assigning a unique access channel for a mobile station for a predetermined time period. A structure for preventing contention of the access channel by assigning a designated access channel to a mobile station for a predetermined time period is disclosed in, for example, Korean Patent Application Nos. 98-03125 and 98-04099, assigned to the same assignee as the present invention. In a preferred embodiment of the present invention, the above contention preventing technique enables a diversity combiner to use the diversity between sector antennas within a base station or between base stations. In the preferred embodiment of the present invention, the description will be given on the assumption that the common channel is an access channel on a reverse link.

Figure 1A:
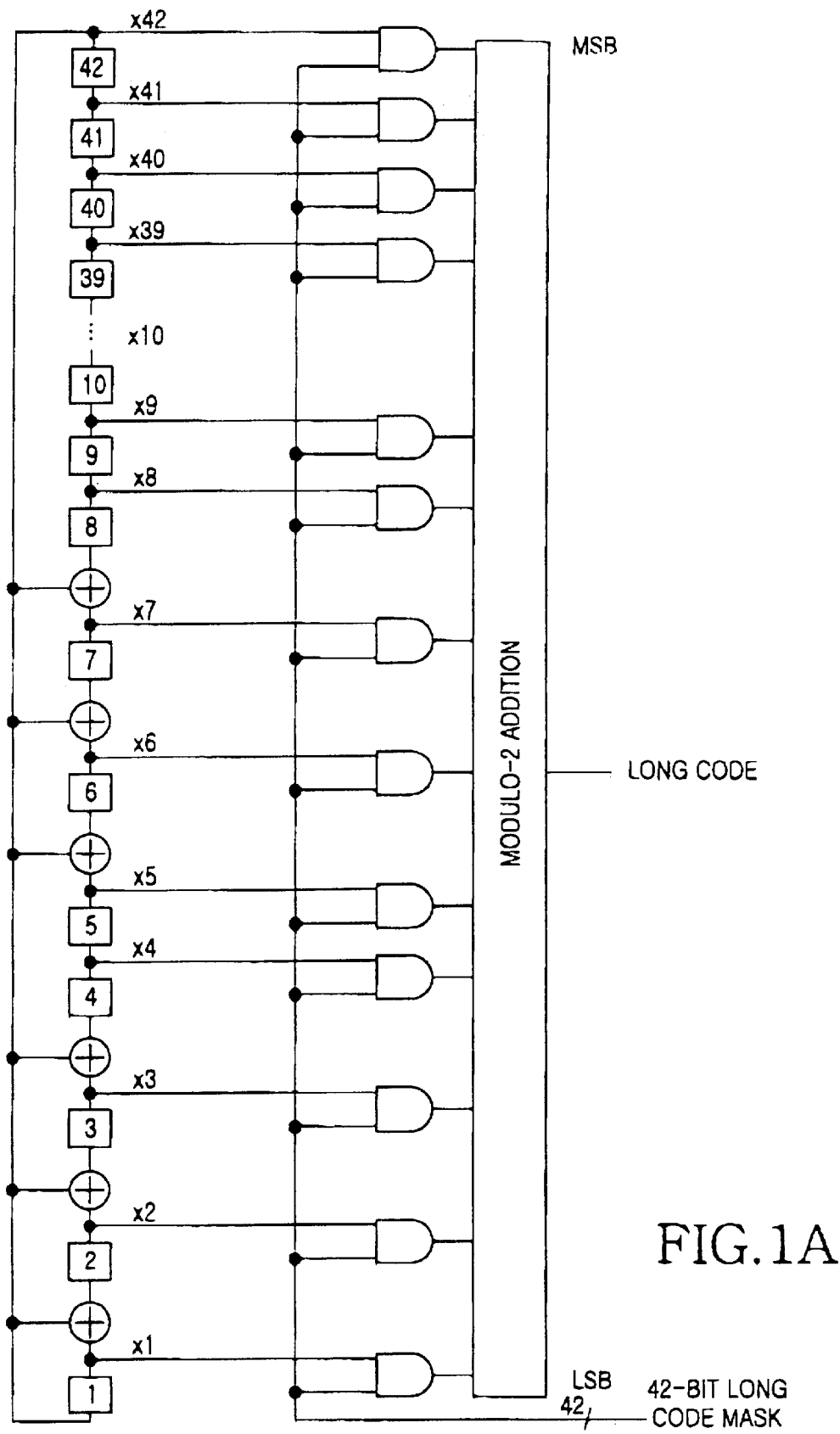
FIG. 1A illustrates a configuration of a long code generator on a reverse link in a conventional communication system.
Figure 2:
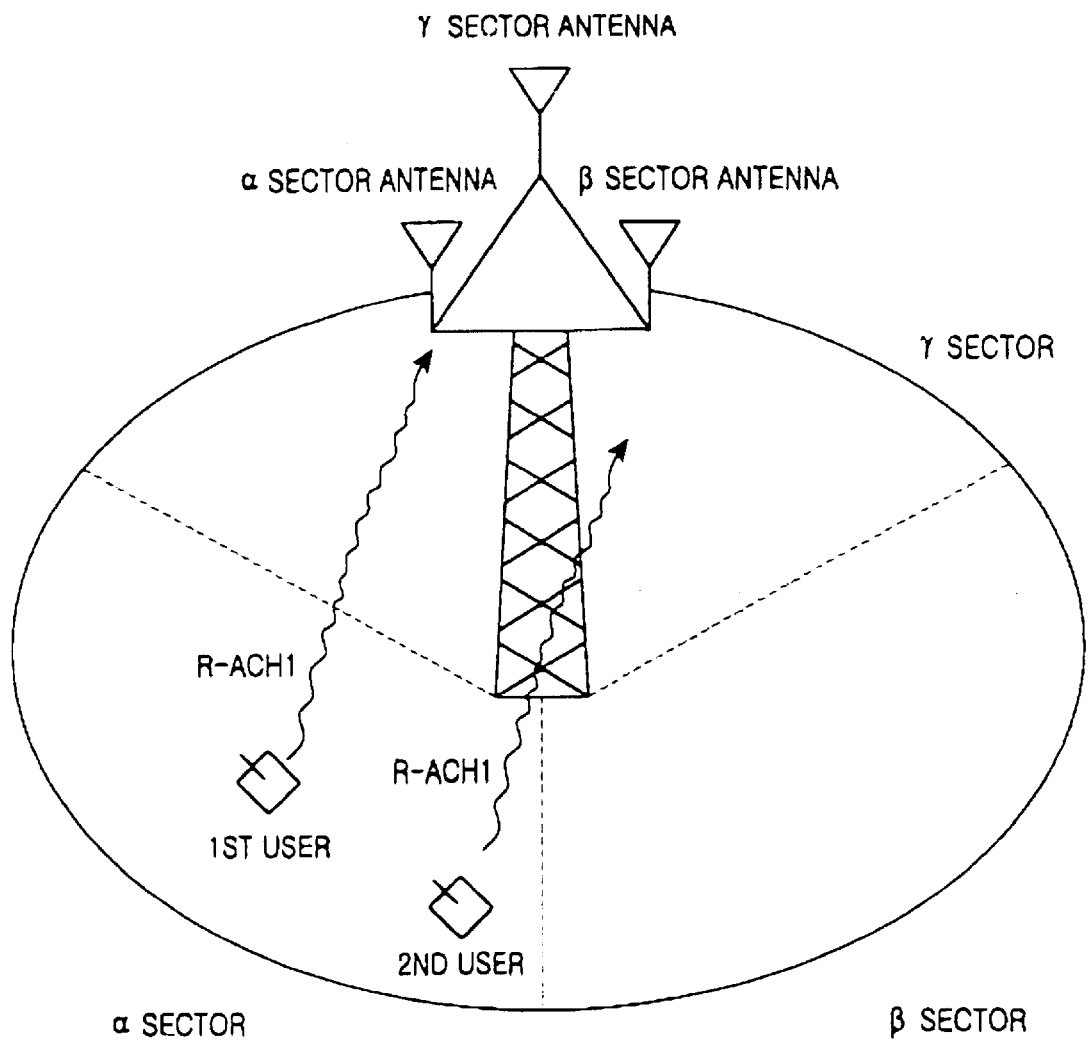
FIG. 2 is a diagram showing the disadvantage of diversity combining signals on a reverse common channel in a conventional CDMA communication system.
Figure 3A:
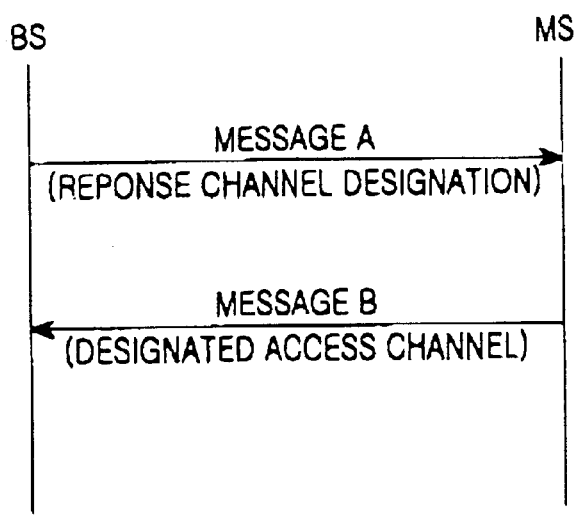
FIG. 3A is a diagram of the process of the base station designating a reverse common channel of a mobile station according to an embodiment of the present invention.
Figure 3B:
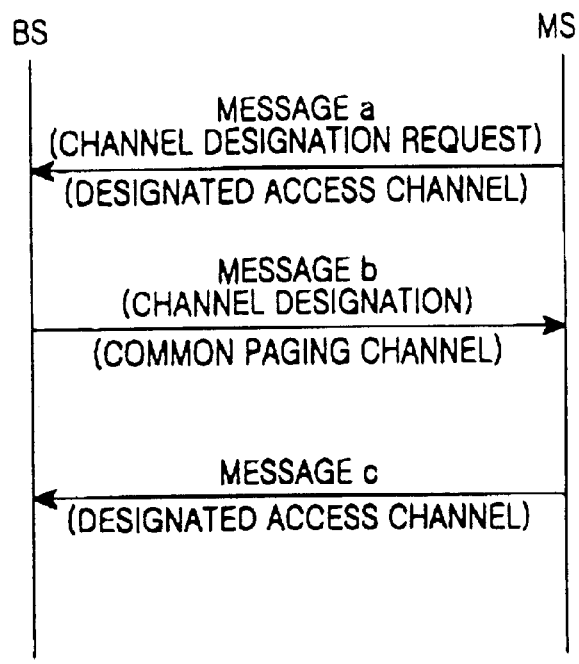
FIG. 3B is a diagram of the process of the mobile station requesting the base station to designate a reverse common channel of a mobile station according to an embodiment of the present invention.

FIGS. 3A and 3B illustrate the processes of designating a channel to be used for an access channel for a predetermined time period in order to avoid contention.

Referring to FIG. 3A, the base station (BS) transmits message A which includes a channel identifier to the mobile station (MS). This channel identifier designates the access channel which the mobile station will use to communicate with the base station. After the mobile station receives message A which includes the channel identifier from the base station, the mobile station transmits a response B on the access channel designated by the base station. The channel identifier is the identification (ID) of a spreading code of the particular access channel which can be used as a dedicated channel. This channel may be used by a specific mobile station or as a quasi-dedicated channel by a few mobile stations. The spreading code may be a long code. Accordingly, in the preferred embodiment of the present invention, the base station and particular mobile station generate a predefined dedicated spreading code of the mobile station used for the reverse common channel. The dedicated spreading code may be a long code mask or a public long code mask which is generated using an ESN (Electronic Serial Number) assigned to the mobile station as a unique number, or one of the specific long codes which are designated to use the common channel as a dedicated channel. In the present invention, it is assumed that the channel identifier is a long code ID. Because the response B is transmitted on a designated access channel, the mobile station can avoid contention with other mobile stations.

In FIG. 3B, the mobile station requests the base station to designate the access channel. To begin the process, the mobile station transmits a message a which includes a message flag and a channel designation request flag on the common access channel to the base station. The message flag indicates whether there is a message following the present message. The channel designation request flag is to request the base station to assign a specific channel code of the access channel so that the mobile station will have a designated access channel to transmit a message to the base station.

The base station receives message a with the channel designation request flag, and then determines whether to designate the channel. Once that determination is made, the base station transmits a message b including the channel designation flag and the channel identifier to the mobile station. A channel designation flag indicates whether the base station has determined to designate a channel as the mobile station requested. The channel identifier is the spreading code ID of the access channel that was described above.

After the mobile station receives message b including the channel designation flag and channel identifier, the mobile station transmits message c on the access channel designated by the base station. This is assuming the base station determined to designate a channel to the mobile station. By transmitting data on the designated access channel, the message c transmitted from the mobile station can avoid contention.

Figure 4:
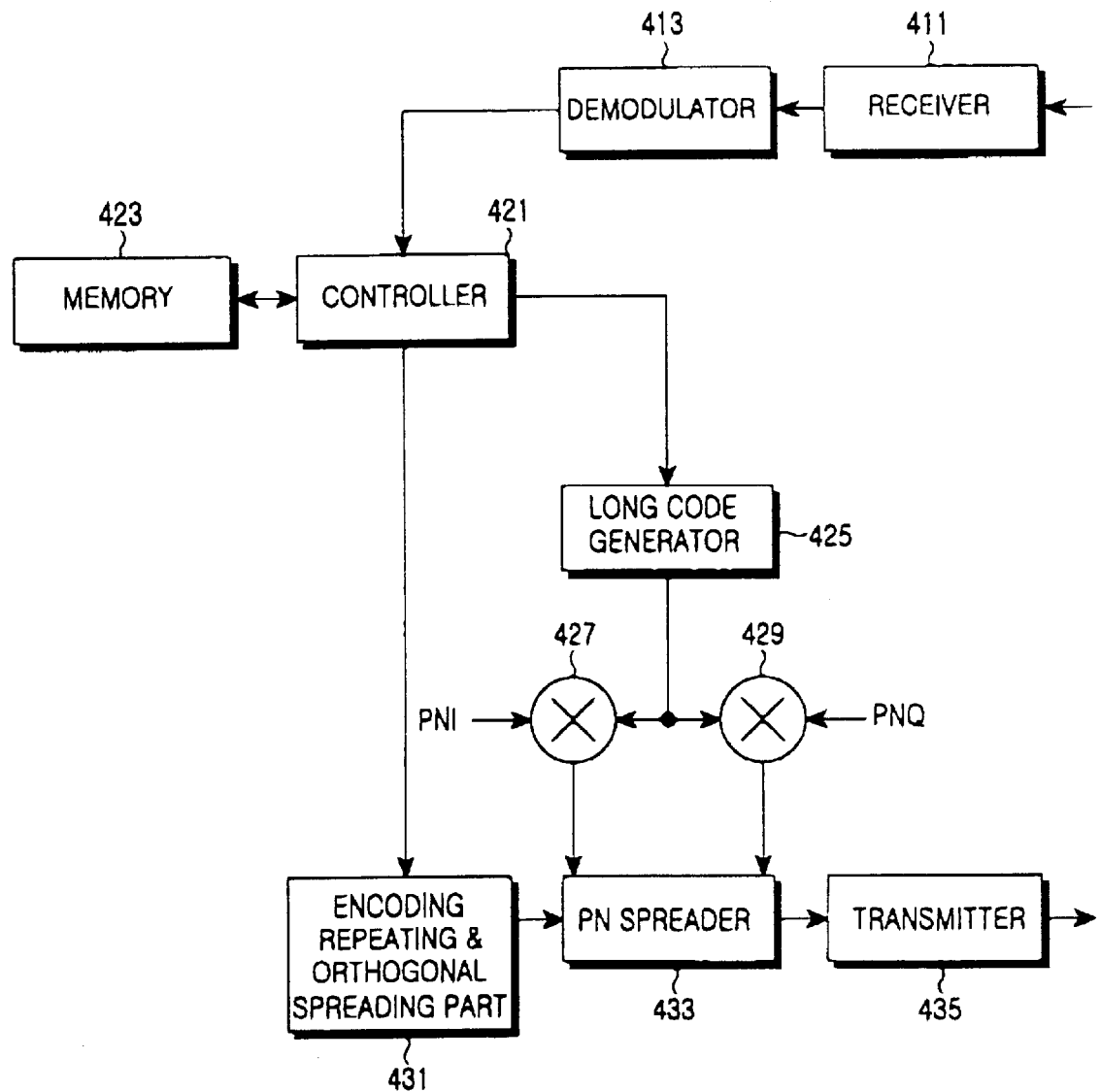
FIG. 4 is a block diagram of a mobile station according to an embodiment of the present invention.

FIG. 4 is a block diagram of a mobile station for transmitting a message on the access channel. In the configuration of FIG. 4, the mobile station receives and analyzes a message output from the base station and generates a control message for designating a channel.

Referring to FIG. 4, a receiver 411 converts an RF (Radio Frequency) signal on a forward link, received through an antenna into a baseband signal. A demodulator 413 demodulates the baseband signal output from the receiver 411 into the original signal. A controller 421 generates messages to be transmitted on the access channel and analyzes the field information of the control message output from the demodulator 413 in order to generate the long code ID of the designated access channel.

The memory 423 stores long code information for designating the common access channel. Accordingly, if the control message includes a long code ID for designating the access channel as a dedicated channel, the controller 421 will use that long code ID. However, if the control message does not include the long code ID, the controller 421 selects a long code ID stored in the memory 423 and provides the selected long code ID to a long code generator 425.

When a message is being transmitted to the mobile station on the access channel for the first time (as shown in FIG. 3A), the controller 421 selects the long code ID stored in the memory 423. In every case when the received control message does not include a long code ID, the controller 421 can use a long code ID stored in the memory 423. However, if the long code ID is designated by the received control message, the controller 421 will always use that long code ID. Once the controller 421 has a long code ID, it directs the long code generator 425 to generate the long code of the designated access channel.

Accordingly, the long code IDs stored in the memory 423 may be for the long codes of the common access channel which is commonly used by multiple mobile stations. The long code ID output from the controller 421 may be a long code ID used for the access channel as a dedicated channel by a specific mobile station or as a quasi-dedicated channel by a few mobile stations.

An encoding, repeating and orthogonal spreading part 431 encodes, repeats, interleaves and orthogonally spreads the access channel signal from the message which is output from the controller 421. Multipliers 427 and 429 multiply short PN sequences PNI and PNQ by the long code output from the long code generator 425 to output spreading codes for additionally spreading the already orthogonally spread channel access signal. A PN spreader 433 multiplies the I- and Q-channel spread codes output from the multipliers 427 and 429 by the orthogonally spread or orthogonally modulated access channel signal. A transmitter 435 converts the spread access channel signal output from the PN spreader 433 to an RF signal. The encoding, repeating and orthogonal spreading part 431 is a configuration of an access channel transmitter and configurations of other channel transmitters on a reverse link are not shown.

A base station controller (BSC) designates a channel to be used for the access channel by the mobile station and informs the base station of the designated channel. Alternatively, the base station may designate the access channel of the mobile station and inform the BSC of the designated access channel, so that the BSC can notify other base stations which are to demodulate the corresponding access channel of the designated access channel. The base stations should demodulate signals transmitted from the mobile station on the designated access channel. A plurality of base stations demodulate signals transmitted on the designated access channel according to mobile station information received from the BSC. The base stations demodulating the access channel signal of the mobile station may be only those base stations which are transmitting a message to a corresponding mobile station on a forward link or may be all the base stations.

The access channel signal of the mobile station demodulated by a plurality of base stations are combined by a diversity technique. This diversity combining operation is similar to the operation during softer handoff or soft handoff in the IS-95 communication system. Although the conventional communication system has performed the diversity combining operation during softer handoff or soft handoff only on a traffic channel, the present invention can apply the diversity combining operation to the access channel transmitted as a designated channel. The signals demodulated by a plurality of base stations can be diversity combined in many ways.

Figure 5:
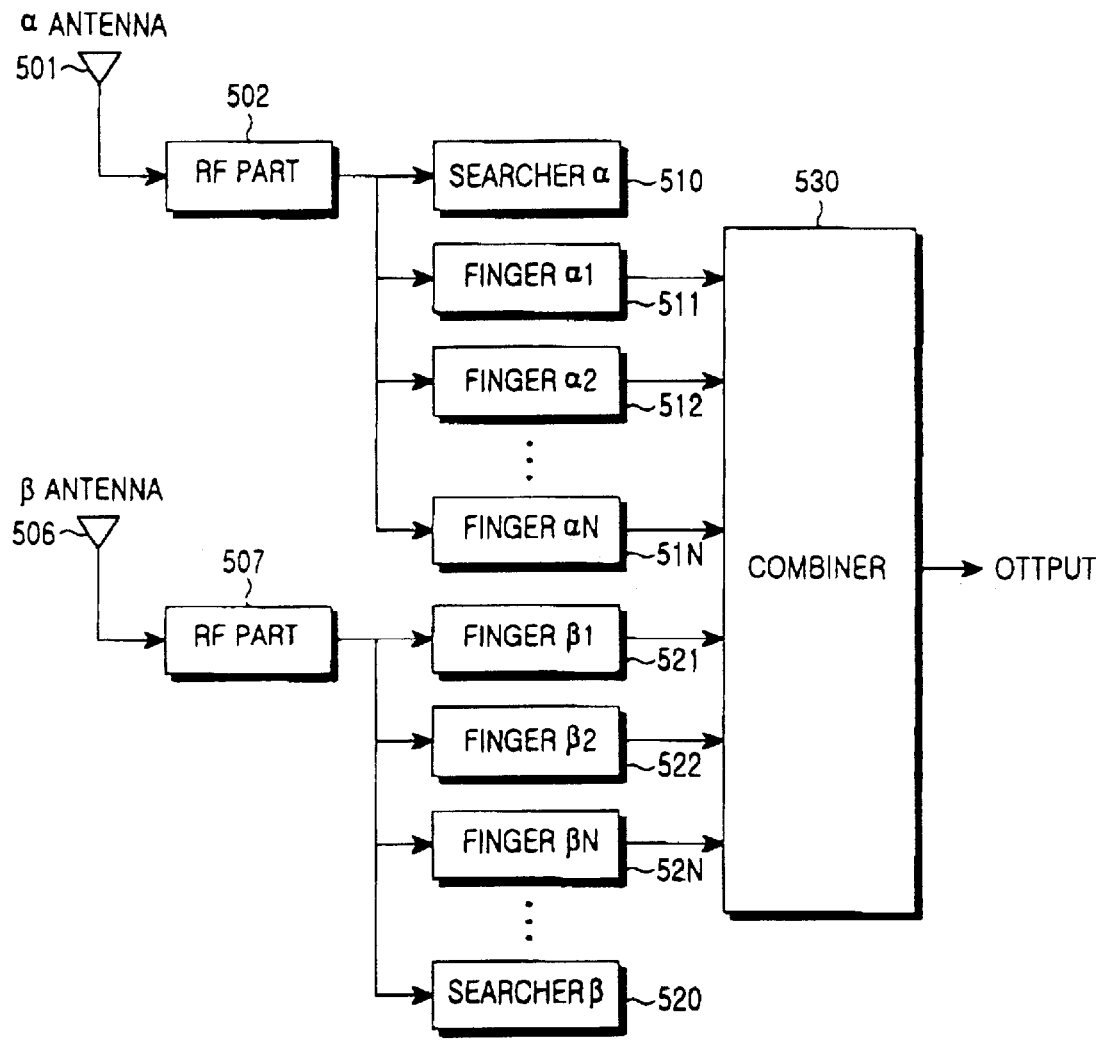
FIG. 5 is a block diagram of a receiver of a base station according to an embodiment of the present invention.

FIG. 5 shows the receiver of only one base station. It is assumed that one cell is divided into a plurality of sectors, and that the base station transmits and receives signals through directional antennas corresponding to the respective sectors. For simplicity of description, it is also assumed that there is only one base station in one cell demodulating the designated access channel of the mobile station. The demodulating operation of FIG. 5 is similar to the operation of demodulating a signal on a reverse traffic channel during softer handoff of the traffic channel in the IS-95 communication system.

In FIG. 5, the receiver of the base station demodulates signals received through two sector antennas. The receiver is comprised of a plurality of fingers for demodulating signals received through the sector antennas. The searchers 510 and 520 detect multipath signals received through antennas 501 and 506, search for the positions of multipath components of the signals, and then assign these positions to corresponding fingers 511–51N and 521–512N. The fingers 511–51N and 521–52N receiving the signals received through the antennas 501 and 506 demodulate the multipath components. A combiner 530 combines the outputs of the fingers 511–51N and 521–52N by a diversity technique.

Figure 6:
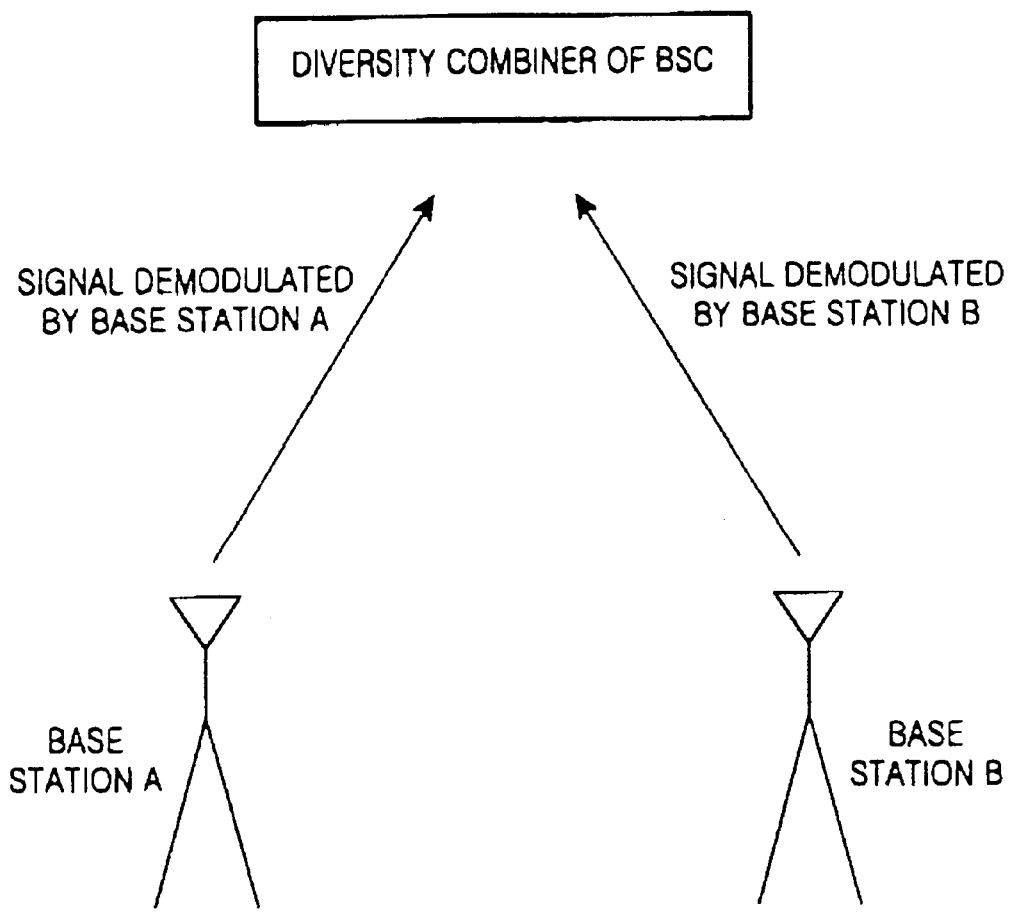
FIG. 6 is a block diagram of a structure for diversity combining signals received from a plurality of base stations according to an embodiment of the present invention.

FIG. 6 illustrates a structure in which base stations in different cells receive and then combine signals transmitted from the mobile station on the designated access channel. It is assumed that the base stations in two different cells demodulate the signals transmitted from the mobile station on the designated access channel. The base stations each have the receiver structure shown in FIG. 5. Each base station demodulates the signal transmitted from the mobile station on the designated access channel and sends the demodulated signal to the BSC by wires. The BSC has a diversity combiner for diversity combining the signals transmitted from the respective base stations, thereby obtaining a diversity gain.

There are various ways of combining the signals transmitted from the base stations to the BSC. A few examples will now be described.

First, the receiver of each base station combines and then decodes the multipath signals of the respective sector antennas. The receiver of each base station calculates the reliability of the decoded signal. The reliability of the decoded signal may be determined from a decoding metric of the decoder, the signal level of the received signal, or a combined form of them. Each base station transmits the decoded signal and the reliability of the received signal to the BSC by wires. The BSC receives the signals decoded by the base stations and selects the signal decoded by the base station having the highest reliability to be the reception message.

Second, the receiver of each base station demodulates the multipath signals of the respective sector antennas and diversity combines the demodulated signals. Here, channel decoding is not performed. Each base station transmits the reliability of the received signal, for example, each symbol output of the combiner to the BSC. The diversity combiner of the BSC combines the reliabilities of the symbols transmitted from the respective base stations by a diversity technique and then channel-decodes the combined result. That is, the reliabilities of the symbols can be combined by a diversity technique of the BSC. The channel-decoded signal is output as a final reception message.

If the signal on the access channel is successfully received, the base station transmits an acknowledge message to the mobile station on a forward channel.

As described above, the base stations demodulate messages transmitted from the mobile station on the designated access channel for a certain time period and diversity combine the demodulated signals, thereby obtaining a diversity gain.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for combining common channel signals using a first base station for communicating with a specific mobile station, a second base station adjacent to said first base station and a base station controller for controlling said first and second base station and including a diversity combiner in a code division multiple access (CDMA) communication system, comprising the steps of:

assigning, at said first base station, a dedicated common channel to said mobile station;

transmitting, at said first base station, information about the assigned dedicated common channel to said base station controller coupled to said first base station;

transmitting, at said base station controller, said dedicated common channel information to said second base station which is connected to said base station controller;

demodulating, at said first and second base station, signals received on said assigned dedicated common channel and transmitting said demodulated signals to said base station controller; and combining, at said diversity combiner of said base station controller, the demodulated signals of said dedicated common channel that are output from said first and second base stations.

2. The method as claimed in claim 1, further comprising the step of demodulating, at said at least one second base station, a common channel signal transmitted from said mobile station on a reverse link by combining said common channel signal by a diversity technique.

3. The method as claimed in claim 2, wherein said dedicated common channel is an access channel.

4. The method as claimed in claim 1, wherein said assigning step uses a channel identifier for designating said dedicated common channel.

5. The method as claimed in claim 4, wherein said channel identifier for designating said dedicated common channel is an electronic serial number (ESN).

6. The method as claimed in claim 4, wherein said channel identifier for designating said dedicated common channel is a public long code ID.

7. The method as claimed in claim 4, wherein said channel identifier for designating said dedicated common channel is a specific long code ID predefined between said first base station and said mobile station.

8. A device for combining signals by a diversity technique on a common channel in a code division multiple access (CDMA) communication system, comprising:

a first base station for transmitting a channel identifier for designating a dedicated common channel to a specific mobile station, said first base station also transmitting information about the designated dedicated common channel comprising said channel identifier to a base station controller, said first base station further demodulating signals received on said designated dedicated common channel to transmit demodulated signals to said base station controller;

said base station controller for receiving said dedicated common channel information from said first base station and transmitting said dedicated common channel information to at least one second base station adjacent to said first base station;

said second base station for designating a corresponding dedicated common channel by said channel identifier output from said base station controller, demodulating said designated dedicated common channel signals and transmitting said demodulated signals to the base station controller; and said base station controller further having a diversity combiner for combining said received demodulated signals of said dedicated common channel and determining a diversity gain.

9. The device as claimed in claim 8, wherein said dedicated common channel is an access channel.

10. The device as claimed in claim 8, wherein said channel identifier is an electronic serial number (ESN).

11. The device as claimed in claim 8, wherein said channel identifier is a public long code ID.

12. The device as claimed in claim 8, wherein said channel identifier is a specific long code ID predefined between said first base station and said mobile station.

13. A method for combining signals using a diversity technique on a common channel in a code division multiple access (CDMA) communication system, wherein a cell is divided into a plurality of sectors and a base station includes antennas corresponding to the respective sectors, comprising the steps of:

transmitting a channel identifier for assigning a dedicated common channel to a specific mobile station in said base station, and assigning said dedicated common channel to receivers of at least two adjacent sectors as the dedicated common channel by said channel identifier;

demodulating, at receivers of respective sectors in said base station, said dedicated common channel signals received from said sector antennas corresponding to said respective sectors; and combining signals received on said dedicated common channel of said at least two adjacent sectors by the diversity technique.

14. The method as claimed in claim 13, wherein said dedicated common channel is an access channel.

15. The method as claimed in claim 14, wherein said channel identifier is an electronic serial number of said mobile station.

16. A device for combining signals by a diversity technique on a common channel in a code division multiple access (CDMA) communication system, wherein a cell is divided into a plurality of sectors and a base station includes antennas corresponding to the respective sectors and transmits a channel identifier for assigning a dedicated common channel to a specific mobile station in said base station, comprising:

a first sector channel receiver corresponding to a first sector of said plurality of sectors for designating a dedicated common channel by said channel identifier and demodulating a signal received through a first sector antenna corresponding to said first sector on said designated dedicated common channel;

a second sector channel receiver corresponding to a second sector of said plurality of sectors for designating a dedicated common channel by said channel identifier and demodulating a signal received through a second sector antenna corresponding to the second sector on said designated dedicated common channel; and a combiner for combining signals of the specific mobile station output from said first and second sector channel receivers by the diversity technique.

17. The device as claimed in claim 16, wherein said dedicated common channel is an access channel.

18. The device as claimed in claim 16, wherein said channel identifier is an electronic serial number (ESN) of said mobile station.

* * * * *